(12) United States Patent
Smets et al.

(10) Patent No.: US 6,411,415 B1
(45) Date of Patent: Jun. 25, 2002

(54) OPTICAL TRANSMISSION SYSTEM WITH A RECEIVER USING FULL OPTICAL CLOCK RECOVERY

(75) Inventors: Robert C. J. Smets; John J. E. Reid, both of Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/251,238

(22) Filed: Feb. 16, 1999

(30) Foreign Application Priority Data

Feb. 16, 1998 (EP) .............................................. 98200478

(51) Int. Cl.[7] .............................................. H04B 10/00
(52) U.S. Cl. ........................ 359/158; 359/173; 359/179; 359/195; 385/24; 385/47; 385/48
(58) Field of Search ................................ 359/158, 195, 359/179, 173; 385/47, 48, 24

(56) References Cited

U.S. PATENT DOCUMENTS

| | | | |
|---|---|---|---|
| 4,962,987 A | * 10/1990 | Doran ...................... | 350/96.15 |
| 5,146,517 A | * 9/1992 | Avramopoulos et al. ...... | 385/39 |
| 5,477,555 A | * 12/1995 | Debeau et al. ................ | 372/25 |
| 5,548,433 A | * 8/1996 | Smith .......................... | 359/158 |

OTHER PUBLICATIONS

"10Gbit/s all–optical regenerator", by W.A. Pender et al., Electronics Letters, Aug. 31, 1995, vol. 31, No. 18, pp. 1587–1588.

"All–optical clock recovery using a modelocked figure eight laser with a semiconductor nonlinearity", by L.E. Adams et al., Electronics Letters, Sep. 29, 1994 vol. 30, No. 20, pp. 1696–1697.

* cited by examiner

Primary Examiner—Jason Chan
Assistant Examiner—Dzung Tran
(74) Attorney, Agent, or Firm—Daniel J. Piotrowski

(57) ABSTRACT

In an optical transmission system a transmitter (2) generates a sequence of time domain division multiplexed pulses and transmits them via an optical transmission medium (4) to a receiver (6). In the receiver (6) the received optical multiplex signal is applied to an optical demultiplexer (30) and to a clock recovery element (48). The clock recovery element (48) generates optical clock pulses which are used to control optically controlled optical switches (32 . . . 38) which demultiplex the optical signal. The optical clock recovery circuit is based on a laser which is mode locked by the received optical signal. The mode locked laser comprises an optical amplifier (50) having its output coupled to its input by a feedback loop comprising a polarization controller (52), a saturable absorber (61), a coupling element (56) and a adjustable delay (51). The received optical signal is coupled into the feedback loop by means of the coupling element (56). The saturable absorber (61) comprises a 3 dB, 90° coupling element (54) being coupled to a secondary loop. Said secondary loop comprises an attenuator (60) and an amplifier (62). The amplifier (62) is placed asymmetrically in the secondary loop. Due to the non-linearity in the secondary loop, the optical pulses propagating in the secondary loop interfere destructively for low signal levels, and interfere constructively for high signal levels.

9 Claims, 4 Drawing Sheets

OPTICAL TRANSMISSION SYSTEM WITH A RECEIVER USING FULL OPTICAL CLOCK RECOVERY

BACKGROUND OF THE INVENTION

The present invention relates to an optical transmission system comprising a transmitter for transmitting optical pulses via an optical transmission medium to a receiver, the receiver comprises optical clock recovery means for generating a sequence of optical pulses with a frequency related to a pulse frequency of the optical pulses received from the transmission medium, the optical clock recovery means comprises an optical amplifier having its input coupled to its output via a feedback loop, said feedback loop comprises a non linear element, the optical clock recovery means comprises injection means for injecting the optical signal received from the optical transmission medium.

The invention further relates to an optical receiver, clock recovery means and a non-linear optical element.

Such a transmission system is known from the article "10 Gbit/s all-optical regenerator" by W. A. Pender et. al. in Electronics Letters $31^{st}$ August 1995, Vol. 31, No. 18. pp. 1587–1588.

The transmission rate of optical transmission systems is increasing rapidly, due to improvements of optical components such as lasers, modulators, multiplexers and demultiplexers. The transmission rate approaches the limit of capabilities of the used electrical components such as photo detectors and modulators. To overcome this limitations there is a trend to use time division multiplex in which a plurality of optical signals with a bitrate of e.g. 10 Gbit/s are multiplexed into an optical signal with a higher bitrate e.g. 40 Gbit/s. This multiplexing can completely be performed by optical means.

In the receiver the received optical signal has to be demultiplexed by optical means because using electrical components for handling such a high bitrate signal is very difficult. Such optical demultiplexing requires the availability of an optical clock signal. Because this clock signal has to be synchronized to the received input signal, the receiver comprises clock recovery means to extract the required optical clock signal from the received signal. In the optical transmission system according to the above mentioned article, clock recovery means using only optical components are used.

The clock recovery system according to the above mentioned article is based on mode locking of a ring-laser in which the received optical signal is injected. A ring laser comprises an optical amplifying device having its output coupled to its input by means of a feedback loop. Mode locking is a phenomenon that results in the generation of optical pulses having a repetition rate which is a multiple of the reciprocal of the round trip delay of the combination of amplifier and feedback loop. The phenomenon is caused by non-linear amplitude and phase transfer in the feedback loop. To obtain said non-linear amplitude and phase transfer a non-linear element is present in the feedback loop.

In the transmission system according to the above mentioned article the non-linear element comprises 1 km dispersion shifted fiber followed by a polarizer. A first non-linear effect comprises a change of the polarization state in dependence of the amplitude of the optical signal in the 1 km dispersion shifted fiber. A second non-linear effect is a phase shift in the fiber which is dependent on the amplitude in the fiber. The polarizer is adjusted such that it passes the light signals only for a polarization state corresponding to the polarization state for a signal with a high amplitude.

A problem with the clock recovery system according to the above mentioned article is that it requires 1 km of optical fiber, making integration of said system impossible.

SUMMARY OF THE INVENTION

The object of the present invention is to provide a transmission system according to the preamble of which the receiver has substantially smaller dimensions than the receiver according to the prior art.

To achieve said object, the present invention is characterized in that said non linear element comprises a four port coupling element, two ports of the coupling element being included in the feedback loop and two ports being included in a secondary loop, the coupling element being arranged for coupling a first optical signal into a first branch of the secondary loop and for coupling a second optical signal into a second branch of the secondary loop, the secondary loop being arranged for causing signal level dependent interference between the first and second optical signal when re-entering the coupling element By using a secondary loop in which two optical signals propagate in opposite directions, it becomes possible to use level dependent interference between said two optical signals to obtain a non-linear operation. If e.g. for a first level of the optical signals non-destructive interference occurs and for a second level destructive interference occurs it is obtained that the non-linear element passes signals having the first level, and attenuates signals having the second level. A non-linear element according to the invention can have much smaller dimensions than the non-linear element used in the prior art transmission system.

It is observed that the article "All-optical clock recovery using a modelocked figure eight laser with a semiconductor non-linearity" by L. Adams, E. Kintzer and J. Fujimoto in Electronics Letters No. 20, Vol. 30, Sep. 29, 1994 an optical clock recovery system is disclosed in which a primary and a secondary loop is used. In this system however, the input signal of the receiver is injected into the secondary loop instead of into the feedback path of the amplifier. This has as consequence that the laser will not be modelocked when the input signal is absent, but the laser will generate a CW signal. This is in general undesirable in a time domain multiplexed system, because it causes the input signal to be passes to all tributary outputs. It has further been shown that the pulse rate of the "FIG. 8" laser is lower and the pulse width is higher than the corresponding values of the system according to the invention.

An embodiment of the invention is characterized in that the first branch of the secondary loop is coupled to a first port of a further optical amplifier, in that the second branch of the secondary loop is coupled to a second port of the optical amplifier and in that the delay values of the branches of the secondary loop are different.

An optical pulse entering the coupling element will split in two optical pulses propagating in the secondary loop in opposite directions. The optical pulse propagating through the branch with the shorter delay value will arrive earlier at the amplifier.

If the level of the optical pulse exceeds a given level, the amplifier will be saturated and the gain will decrease. When the second pulse arrives at the amplifier, this pulse will be amplified by a smaller factor that the first pulse. Consequently the two optical pulses will have different amplitudes when re-entering the coupling element. Also the phases will be different due to the amplitude dependent phase shift in the amplifier. If this phase difference is properly chosen non-destructive interference will occur in the coupling element.

If the level of the optical pulses is small, the amplifier is not influenced by the optical pulses. Consequently both pulses remain equal after having propagated in the secondary loop. If the properties of the coupling element are chosen correctly, destructive interference will occur for such low level pulses.

A further embodiment of the invention is characterized in that the amplitude transfer factors of the branches of the secondary loop are different.

By making the amplitude transfer functions of both parts of the secondary loop different, it is prevented that the amplifier is also saturated by the second pulse, causing the amplifier faster to recover. This results in a faster non-linear element.

A still further embodiment of the invention is characterized in that the secondary loop comprises an attenuator to make the amplitude transfer factor of the first branch of the secondary loop different from the amplitude transfer factor of the second branch of the secondary loop.

By using an attenuator for obtaining different amplitude transfer factors for the parts of the secondary loop it is obtained that the dimensions of the secondary loop can be substantially reduced because the different attenuation factors do not have to be obtained by different fiber lengths.

BRIEF DESCRIPTION OF THE DRAWING

The invention will now be explained with reference to the drawings.

DESCRIPTION OF THE PREFERRED EMBODIMENTS

Figure 1:
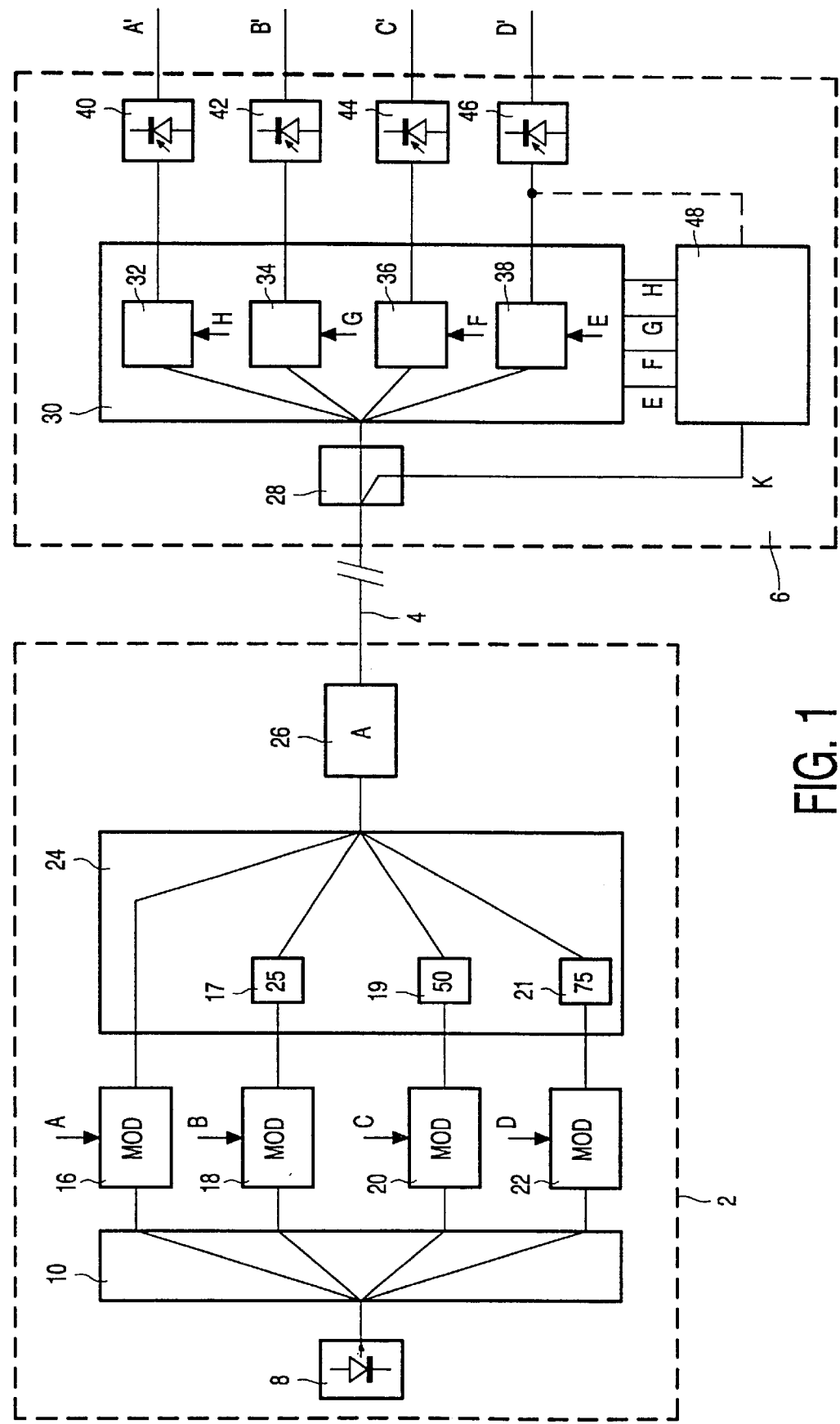
FIG. 1 shows a transmission system according to the invention.

In the transmitter 2 in the transmission system according to FIG. 1, a laser 8 generates an continuous stream of optical pulses. These optical pulses have a repetition period of 100 ps in the case of a tributary bitrate 10 Gbit/s. If four tributary signals have to be time division multiplexed, the width of the optical pulses generated by the laser has to be smaller than 25 ps. in order to enable time multiplexing of four of these pulses.

The output of the laser 8 is coupled to an input of an power splitter 10 which splits its input signal into four equal output signals. A first output of the splitter 10 is coupled to an input of an amplitude modulator 16 which passes or blocks the pulses generated by the laser 8 in dependence of a 10 Gbit/sec digital signal which is applied at the input A of the amplitude modulator 16.

A second output of the power splitter 10 is coupled to an input of an amplitude modulator 18 which passes or blocks the pulses generated by the laser 8 in dependence of a 10 Gbit/sec digital signal which is applied at the input B of the amplitude modulator 18. A third output of the power splitter 10 is coupled to an input of an amplitude modulator 20 which passes or blocks the pulses generated by the laser 8 in dependence of a 10 Gbit/sec digital signal which is applied at the input C of the amplitude modulator 20.

A fourth output of the power splitter 10 is coupled to an input of an amplitude modulator 22 which passes or block the pulses generated by the laser 8 in dependence of a 10 Gbit/sec digital signal which is applied at the input D of the amplitude modulator.

The output of the amplitude modulator 16 is coupled to a first input of a time division multiplexer 24 which is directly coupled to the output of said multiplexer 24. The output of the amplitude modulator 18 is coupled to a second input of a time division multiplexer 24 which is coupled via a delay element 25 having a delay of 25 ps to the output of said multiplexer 24. The output of the amplitude modulator 20 is coupled to a third input of a time division multiplexer 24 which is coupled via a delay element 19 having a delay of 50 ps to the output of the multiplexer 24. The output of the amplitude modulator 22 is coupled to a fourth input of a time division multiplexer 24 which is coupled via a delay element 21 having a delay of 75 ps to the output of the multiplexer 24.

For a correct operation of the time division multiplexer, the 10 Gbit/s signals applied to the modulators 16, 18, 20 and 22 should be synchronized to a single 10 GHz clock signal. Due to the differing delay values in the branches of the optical time division multiplexer 24, the optical pulses from the modulators which appear simultaneously at the inputs of the time division multiplexer 24 are subjected to delay values increasing with 25 ps steps. This has as result that at the output of the time division multiplexer 24 an optical time division multiplexed signal comprising pulses with a separation of 25 ps is available.

It is observed that it is possible that all four branches of the multiplexer 24 comprise a delay element. The only requirement is that the delay value increases with steps of 25 ps. In general, this delay value increase should be $T_{bit}/N$ in which $T_{bit}$ is the bit period of the tributary signals and N is the number of signals to be multiplexed.

The output of the time division multiplexer 24 is coupled to an optical amplifier 26 which amplifier provides an optical signal with sufficient power to be transmitted over a transmission link 4 to a receiver 6.

In the receiver 6, the optical signal received from the transmission medium is applied to a power splitter 28 which splits the optical input signal into a first part which is supplied to an optical time division demultiplexer 30 and a second part which is supplied to a optical clock recovery system 48.

The optical clock recovery system 48 is arranged for recovering a clock signal equal to the symbol rate of the tributary signals. If the composite bitrate of the optical input signal is 40 Gbit/s the clock recovery system 48 is arranged for generating a plurality of mutually phase shifted clock pulses with a frequency 10 Ghz.

In the optical time domain demultiplexer 30 the optical signal received from the splitter 28 is splitted into four equal parts which are supplied to an input of one of a plurality of optically controlled optical switches 32, 34, 36 and 38. The optically controlled optical switches 32, 34, 36 and 38 can be implemented as so-called TOAD rings which are well known to those skilled in the art.

The clock signals E, F, G and H are applied to control inputs of the optically controlled optical switches 32, 34, 36 and 38. The optically controlled optical switches 32, 34, 36 and 38 are arranged for passing the optical input signal to its output only when there is an optical pulse present at its control input. Because the clock recovery system provides mutually phase shifted pulses, it is obtained that the optically controlled switches are closed in a time division manner. If the instants at which the control pulses are supplied to the optically controlled amplifiers are synchronized to the bitrate of the received optical signal, each of the optically controlled optical switches passes signals at the instant on which one of the time domain multiplexed pulses arrives. In this way at the output of each of the optically controlled optical switches 32, 34, 36 and 38 one single optical tributary signal is available.

Said optical tributary signals are applied to a corresponding photo detector 40, 42, 44 and 46. The photo detectors 40, 42, 44 and 46 derive electrical signals A', B', C' and D' from their optical input signals.

It is observed that it is also possible that the input of the clock recovery system is coupled to the output of one of the optically controlled optical switches as in indicated in FIG. 1 by the dashed line. The optically controlled switch will be opened and closed regularly due to the free running clock signal from the clock recovery system. If a pulse at the input of said optically controlled optical switch coincides with the instant of opening the optical switch, this pulse will be applied to the input of the clock recovery system, causing the clock recovery system to lock on it.

Figure 2:
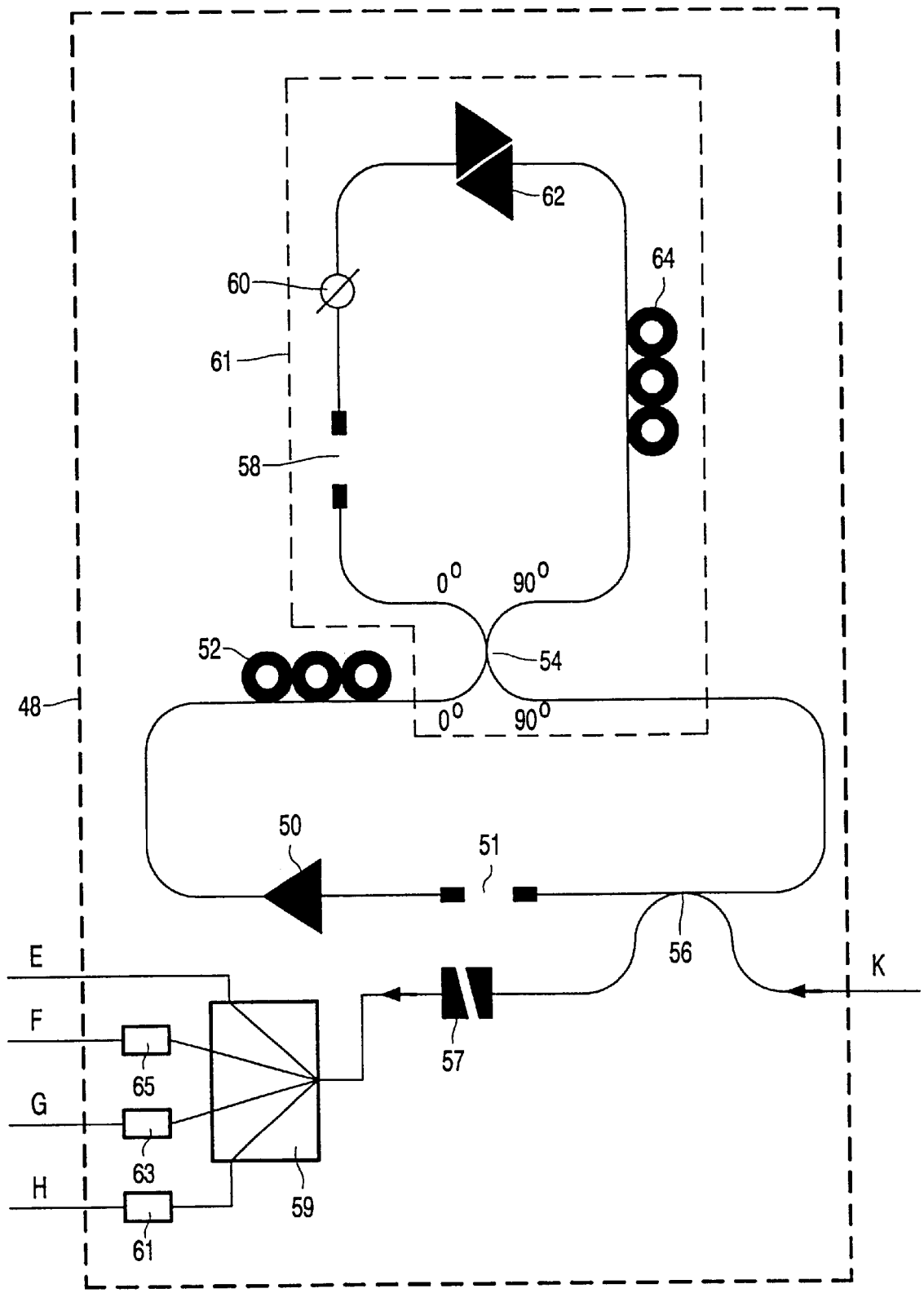
FIG. 2 shows a clock recovery system according to the invention.

In the optical clock recovery system according to FIG. 2 the input signal K is coupled to an input of the injection means being here a port of a 3 dB coupling element 56. The 3 dB coupler 56 is included in the feedback loop which is coupled to the input and the output of an optical amplifier 50. The feedback loop comprises a polarization controller 52, a coupling element 54 which is coupled to the secondary loop, the coupling element 56 and an adjustable delay element 51. It is observed that the polarization controller needs not to be present in the case that integrated waveguides are used, because they allow only the propagation of one polarization state.

The secondary loop 61 acts as a saturable absorber. It passes optical pulses having an amplitude exceeding a predetermined value, and blocks optical pulses having a smaller amplitude. The round trip delay of the combination of the feedback loop and the secondary loop should be equal to a multiple of the symbol period of the optical signal received from the transmitter 2.

The combination of the optical amplifier 50 and the feedback loop constitute a laser oscillator which will start oscillating when switched on. A local (pulse like) perturbation of the intensity of the optical signal in the loop will be emphasized due to the non-linear operation of the saturable absorber 61, and the local pulse like perturbation is converted into a pulse having a higher peak intensity and a smaller width. This process of narrowing of the pulses continues until the pulse become so narrow that its spectrum becomes too wide to pass the amplifier 50 unaffected. This will result in a broader pulse having a lower peak intensity. This interaction between the optical amplifier 50 and the saturable absorber 61 will lead to a stream of optical pulses. The repetition frequency of said optical pulses will be a multiple of the frequency corresponding to the round trip delay. In the system according to the invention this multiple can be a factor of 1000.

The wavelength of the optical pulses is determined by a plurality of factors such as the chirp (=wavelength shifts over the duration of an optical pulse), the dispersion in the loop and the gain profile of the amplifiers in the system. The combination of amplifier and feedback loop will adjust itself such that a pulse at the input of the feedback loop returns with the same spectrum and shape at the output of the optical amplifier 50. The chirp introduced by the amplifier 50 and the saturable absorber 61 can be compensated by the dispersion in the fiber enabling that a round trip gain of 1 is obtained. The polarization controller 52 is present to ensure that the polarization of the of the optical signal remains the same after the optical signal has propagated through the combination of amplifier 50 and the feedback loop.

The saturable absorber 61 comprises a 3 dB 90° four port coupling element 54 which splits a signal which enters one input port into two optical signals having equal amplitudes and 90° phase difference. An optical pulse provided by the amplifier 50 via the polarization controller to the four port coupling element 54 is splitted in two optical pulses having a mutual phase shift of 90°. Said two optical pulses are injected into the secondary loop and will propagate trough it in opposite directions. After the optical pulses have propagated through the secondary loop they enter the four port coupling element 54 where they are combined again.

If the optical pulse injected in the four port coupling element has a small amplitude, the resulting pulses that are injected in the secondary loop are subjected to a same transfer function. Due to the 90° phase shift introduced by the coupling element at the injection of the pulses in the secondary loop and the additional 90° phase shift in the coupling element 54 the two optical pulses will interfere destructively and no output pulse will be present at the 90° output port of the coupling element. If the two optical pulses being injected in the secondary loop have a larger amplitude, they will be subject to differing transfer functions.

The first branch of the secondary loop 61 comprising the polarization controller 64 is shorter than the second branch of the secondary loop 61 comprising the attenuator 60 and the adjustable delay element 58. Consequently the optical pulse propagating via the first branch of the secondary loop will arrive earlier at the amplifier 62. This optical pulse will be amplified and the amplifier 62 will be saturated which results in a reduction of the gain. This reduction of gain results also in a reduction of the phase shift occurring in the optical amplifier 62.

At the arrival of the (attenuated) optical pulse having propagated via the secondary branch of the secondary loop at the amplifier 62, this optical pulses sees an amplifier with a smaller gain and a smaller phase shift. Because the two pulses have now experienced different phase shift values, they will not interfere destructively when recombined at the coupling element 54. By selecting (experimentally) a suitable value of the delay difference of the two branches of the secondary loop by adjusting the adjustable delay element 58 and selecting a suitable attenuation factor of the attenuator 60 it can be obtained that the leading edge of both pulses interfere destructively and that the peak and the trailing edge of both optical pulses interfere constructively. This action yields a reduction of the width of the pulse obtained by combining the pulses having propagated through the secondary loop. This reduction of width results in a wider spectrum, a property which was required for a correct mode locking of the laser comprising the amplifier 50 and the feedback loop.

The primary branch of the secondary loop has an attenuation of 6 dB and the secondary branch of the secondary loop has an attenuation of 16 dB. The amplifier 62 is adjusted to a gain of 20 dB and it has a length of 0.8 mm which corresponds to a delay of 8 ps. Its saturating output power is 10 dBm, the line width enhancement factor is 8 and the carrier lifetime is 200 Ps. Experiments have been done with different amplifiers. When amplifier 50 had a peak gain at 1280 nm and amplifier 62 had a peak gain at 1310 nm, the clock recovery system generated recovered clock pulses at a wavelength of 1330 nm. When both amplifiers had a peak gain at 1280 nm, the regenerated clock pulses had a wavelength lower than 1320 nm. In both cases the wavelength of the input signal of the clock recovery system was 1304 nm.

The polarization controller 64 is present in the secondary loop in order to ensure that the polarization of the optical pulses propagating the secondary loop 61 has the proper state when reentering the coupling element 54.

A part of the recovered clock signal is extracted from the feedback loop by means of the 3 dB coupler 56. A bandpass filter 57 is arranged for filtering the recovered clock signal at 1330 nm from the output signal of the 3 dB coupler 56. The output of the bandpass filter 57 is coupled to an input of a power splitter 59 which splits its input signal into four equal parts. A first output of the splitter 59 is coupled to output E of the optical clock recovery means 48. A second output of the splitter 59 is coupled via a delay element 65 having a delay of 25 ps to output F of the clock recovery means 48. A third output of the splitter 59 is coupled via a delay element 63 having a delay of 50 ps to output G of the clock recovery means 48 and a fourth output of the splitter 59 is coupled via a delay element 61 having a delay of 75 ps to output H of the clock recovery means 48. The use of the delay elements 61, 63 and 65 causes the output pulses at outputs E, F, G and H to be mutually shifted over 25 ps.

Figure 3:
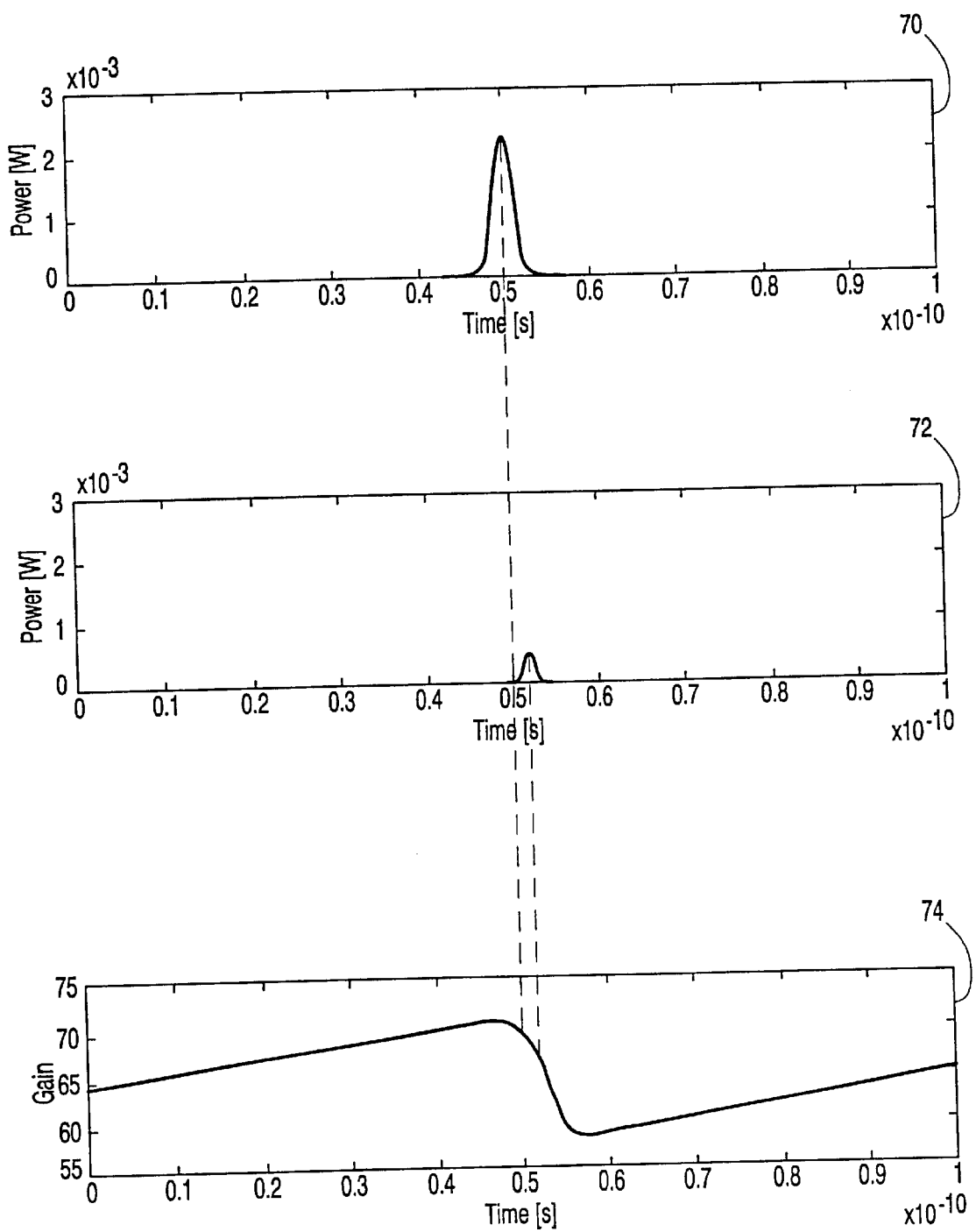
FIG. 3 shows graphs of the pulses propagating in opposite directions in the secondary loop.

Graph 70 of FIG. 3 shows the amplitude of the optical pulse at the input of the amplifier 62 which has propagated via the primary branch of the secondary loop as function of time. Graph 72 shows the amplitude of the optical pulse at the input of the amplifier 62 which has propagated via the secondary branch of the secondary loop as function of time. From a comparison of the graphs 70 and 72 it can be seen that the pulse which propagates via the primary branch of the secondary loop arrives earlier at the amplifier 62 than the pulse which propagates via the secondary branch. Furthermore, the amplitude of the optical pulse according to graph 70 is a factor 10 larger than the optical pulse according to graph 72.

The effect of these pulses on the gain of the amplifier 62 is shown in graph 74. In graph 74 it can be seen that the gain of the amplifier 62 decreases rapidly after the first pulse has passed it. The second pulse passes the amplifier and is subjected to a reduced amount of phase shift. It is observed that the second pulse barely influences the gain of the amplifier 62 due to its substantial smaller amplitude. The leading edges of the pulses interfere destructively, but due to the altered phase shifts, constructive interference occurs for the remainder of the pulses. Consequently the pulse leaving the coupling element is narrowed. It is observed that constructive interference can mean that the two pulses add exactly in phase, but that it also can mean that they add in a way that a significant result remains.

Figure 4:
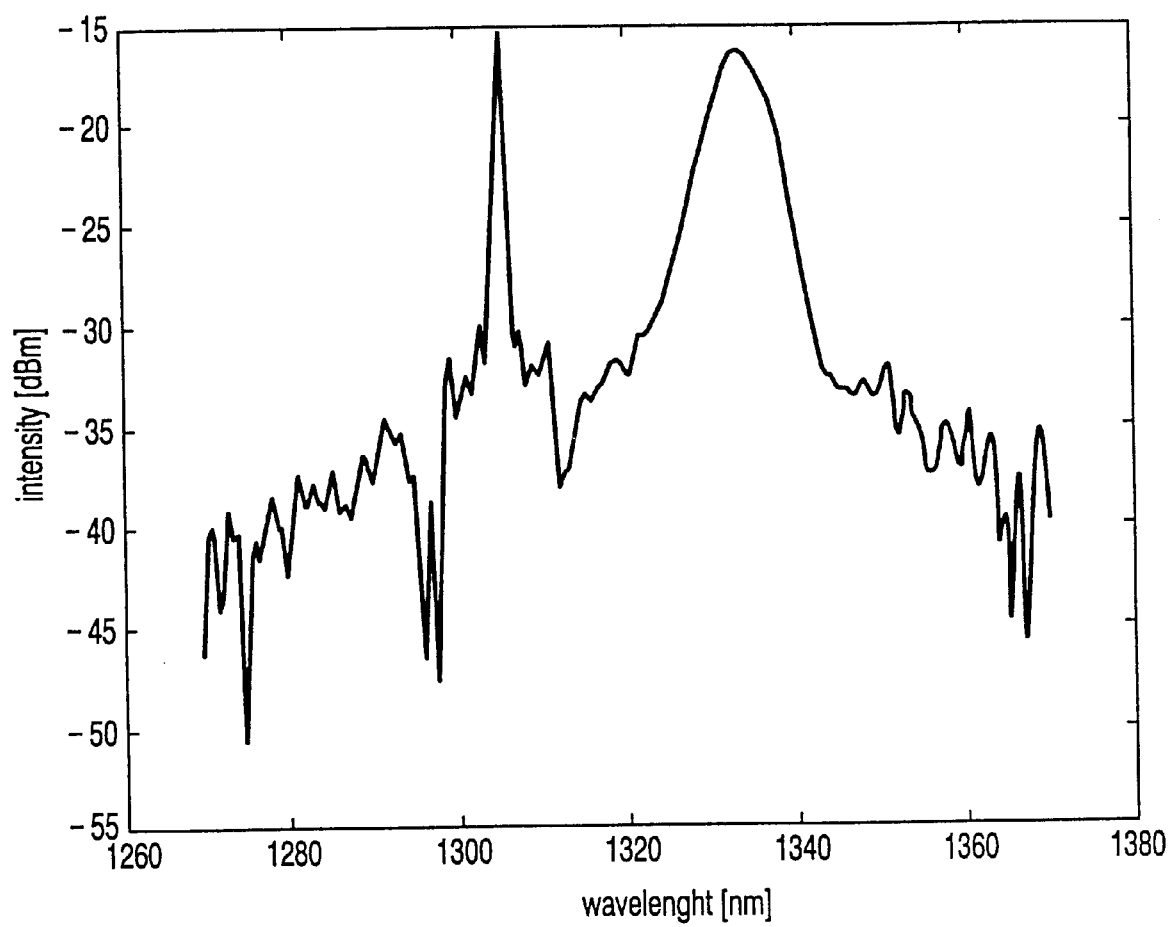
FIG. 4 shows the spectrum of the output signal of the clock recovery system.

FIG. 4 shows the spectrum of the output signal of the clock recovery system. At a wavelength of 1304 nm the input signal is visible, and at a wavelength of 1330 nm the recovered clock signal is visible. From the spectrum it can be seen that the clock recovery system produces narrow pulses because the frequency spectrum around a wavelength of 1330 nm is quite broad.

What is claimed is:

1. Optical transmission system comprising a transmitter for transmitting optical pulses via an optical transmission medium to a receiver, the receiver comprises optical clock recovery means for generating a sequence of optical pulses with a frequency related to a pulse frequency of the optical pulses received from the transmission medium, the optical clock recovery means comprises an optical amplifier having its input coupled to its output via a feedback loop, said feedback loop comprises a non linear element, the optical clock recovery means comprises injection means for injecting the optical signal received from the optical transmission medium into the feedback loop, characterized in that said non linear element comprises a four port coupling element, two ports of the coupling element being included in the feedback loop and two ports being included in a secondary loop, the coupling element being arranged for coupling a first optical signal into a first branch of the secondary loop and for coupling a second optical signal into a second branch of the secondary loop, the secondary loop being arranged for causing signal level dependent interference between the first and second optical signal when re-entering the coupling element.

2. Transmission system according to claim 1, characterized in that the first branch of the secondary loop is coupled to a first port of a further optical amplifier, in that the second branch of the secondary loop is coupled to a second port of the optical amplifier and in that the delay values of the branches of the secondary loop are different.

3. Transmission system according to claim 1, characterized in that the amplitude transfer factors of the branches of the secondary loop are different.

4. Transmission system according to claim 3, characterized in that the secondary loop comprises an attenuator to make the amplitude transfer factor of the first branch of the secondary loop different from the amplitude transfer factor of the second branch of the secondary loop.

5. Transmission system according to one of the claim 1, characterized in that the further optical amplifier comprises a semiconductor amplifier.

6. Optical receiver for receiving optical signals from an optical transmission medium, said receiver comprises optical clock recovery means for generating a sequence of optical pulses with a frequency related to the pulse frequency of the optical pulses received from the transmission medium, the optical clock recovery means comprises an optical amplifier having its input coupled to its output via a feedback loop, said feedback loop comprises a non linear element, the optical clock recovery means comprises injection means for injecting the optical signal received from the optical transmission medium into the feedback loop, characterized in that said non linear element comprises a four port coupling element, two ports of the coupling element being included in the feedback loop and two ports being included in a secondary loop, the coupling element being arranged for coupling a first optical signal into a first branch of the secondary loop and for coupling a second optical signal into a second branch of the secondary loop, the secondary loop being arranged for causing signal level dependent interference between the first and second optical signal when re-entering the coupling element.

7. Optical receiver according to claim 6, characterized in that the first branch of the secondary loop is coupled to a first port of a further optical amplifier, in that the second branch of the secondary loop is coupled to a second port of the optical amplifier and in that the delay values of the parts of the secondary loop are different.

8. Optical receiver according to claim 6, characterized in that the amplitude transfer factors of the branches of the secondary loop are different.

9. Optical clock recovery means for generating a sequence of optical pulses with a frequency related to a pulse frequency of an optical input signal, the optical clock recovery means comprises an optical amplifier having its input coupled to its output via a feedback loop, said feedback loop comprises a non linear element, the optical clock recovery means comprises injection means for injecting the optical signal received from the optical transmission medium into the feedback loop, characterized in that said non linear element comprises a four port coupling element, two ports of the coupling element being included in the feedback loop and two ports being included in a secondary loop, the coupling element being arranged for coupling a first optical signal into a first branch of the secondary loop and for coupling a second optical signal into a second branch of the secondary loop, the secondary loop being arranged for causing signal level dependent between the first and second optical signal when re-entering the coupling element.

* * * * *